(12) United States Patent
Krompass

(10) Patent No.: US 8,839,691 B2
(45) Date of Patent: Sep. 23, 2014

(54) MOTOR VEHICLE PARKING BRAKE

(75) Inventor: Johann Krompass, Passau (DE)

(73) Assignee: Edscha Engineering GmbH, Westerburg (DE)

( * ) Notice: Subject to any disclaimer, the term of this patent is extended or adjusted under 35 U.S.C. 154(b) by 639 days.

(21) Appl. No.: 12/746,470

(22) PCT Filed: Dec. 2, 2008

(86) PCT No.: PCT/DE2008/001991
§ 371 (c)(1),
(2), (4) Date: Jun. 4, 2010

(87) PCT Pub. No.: WO2009/071059
PCT Pub. Date: Jun. 11, 2009

(65) Prior Publication Data
US 2010/0263473 A1   Oct. 21, 2010

(30) Foreign Application Priority Data

Dec. 5, 2007   (DE) .................... 20 2007 017 096 U

(51) Int. Cl.
*B60T 7/08* (2006.01)
*B60T 7/10* (2006.01)
*G05G 1/04* (2006.01)

(52) U.S. Cl.
CPC .................................. *B60T 7/105* (2013.01)
USPC ................. 74/526; 74/533; 74/535; 74/575; 74/538; 188/265

(58) Field of Classification Search
CPC ...................................................... B60T 7/105
USPC ............ 74/526, 533, 535, 575, 538; 188/265

IPC ................................................ B60T 7/02,13/10
See application file for complete search history.

(56) References Cited

U.S. PATENT DOCUMENTS

| 5,950,496 | A * | 9/1999 | Rampp .......................... 74/538 |
| 6,073,513 | A | 6/2000 | Huebner |
| 7,140,476 | B2 * | 11/2006 | Hilss et al. ..................... 188/265 |
| 7,650,815 | B2 * | 1/2010 | Revelis et al. .................. 74/526 |
| 2007/0068317 | A1 | 3/2007 | Krupin |

FOREIGN PATENT DOCUMENTS

| DE | 199 36 733 A1 | 3/2001 |
| DE | 202 10 489 U1 | 11/2002 |
| DE | 101 27 505 A1 | 12/2002 |
| EP | 1 378 410 B1 | 3/2006 |

(Continued)

OTHER PUBLICATIONS

English Abstract of JP 2007-276521, Oct. 25, 2007.*

*Primary Examiner* — Vinh Luong
(74) *Attorney, Agent, or Firm* — Davidson, Davidson & Kappel, LLC

(57) ABSTRACT

A parking brake for a motor vehicle is provided. The parking brake includes a brake actuation lever which is arranged pivotably on a lever holder, a coupling unit for coupling the brake actuation lever to a brake cable, a locking device which comprises a toothing arranged on the lever holder and a locking catch engaging in the toothing, a catch spring for prestressing the locking catch in the direction of the toothing, a release device which comprises a push rod which can be displaced between an inoperative position and a release position along the brake actuation lever, and a triggering element, wherein the push rod has an aperture, a guide element for guiding the push rod and a spring element for prestressing the push rod.

20 Claims, 3 Drawing Sheets

(56) References Cited

FOREIGN PATENT DOCUMENTS

| | | | | |
|---|---|---|---|---|
| EP | 1 752 347 A2 | 2/2007 | | |
| GB | 1428230 | * 3/1976 | | B60T 13/10 |
| JP | 2000-52949 | * 2/2000 | | B60T 7/10 |
| JP | 2005297722 A | 10/2005 | | |
| JP | 2007-276521 | * 10/2007 | | B60T 7/10 |
| WO | WO 01/10688 A1 | 2/2001 | | |
| WO | WO 2004/052706 A1 | * 6/2004 | | B60T 7/10 |

* cited by examiner

MOTOR VEHICLE PARKING BRAKE

Priority is claimed to German Patent Application DE 20 2007 017 096.3, filed Dec. 5, 2007 through international application PCT/DE2008/001991, filed Dec. 2, 2008, the entire disclosures of which are hereby incorporated by reference herein.

The invention relates to a parking brake for a motor vehicle.

BACKGROUND OF THE INVENTION

Known from practical use are parking brakes for motor vehicles which have a brake actuation lever arranged pivotably on a lever holder, a locking device comprising a toothing arranged on the lever holder and a locking catch engaging in the toothing, a coupling unit for coupling the brake actuation lever to a brake cable and a release device. In an embodiment of such parking brakes, the release device includes a push rod which can be displaced along the brake actuation lever between an inoperative position and a release position, wherein the locking catch is pivotably articulated to the push rod. The locking catch is in the form of a double lever with a first lever arm and a second lever arm, and is mounted pivotably on the brake actuation lever in a central region connecting the lever arms. On an end of the first lever arm oriented away from the central region the locking catch has an engaging dog for engaging in the toothing, the pivotable articulation of the locking catch to the push rod being provided on an opposite end oriented away from the central region. A spring element preloads the push rod with respect to the brake actuation lever in the direction of the inoperative position of the push rod, the engaging dog of the locking catch at the same time being preloaded by the preloading in the direction of the toothing. In order to operate the parking brake, the brake actuation lever is pivoted with respect to the lever holder so that the brake cable is pulled. In order to release the parking brake the push rod is moved from the inoperative position to its actuating position against the preloading of the spring element, the engaging dog of the locking catch at the same time being moved out of the toothing, which allows the brake actuation lever to pivot back to its starting position. In the motor vehicle parking brake described, the push rod is displaced with respect to the brake actuation lever against the preloading of the spring element in order to release the parking brake. Once the release process has ended the push rod, driven by the spring element, is moved back to its inoperative position, the push rod being subjected to an impact and to large mechanical forces at the end of the return movement to its inoperative position. Through an impact of the push rod in its inoperative position, firstly, disadvantageously undesired noises are caused and, secondly, parts of the release device arranged on the push rod are subjected to high mechanical stress. In particular if the parking brake is in the form of a handbrake, a release element in the form of a push button is subjected to high acceleration and/or to a very rapid change of acceleration over time, so that mechanical damage to the push button can occur.

DE 199 36 733 A1 describes a parking brake for a motor vehicle which comprises a brake actuation lever arranged pivotably on a lever holder, a locking device which has a toothing arranged on the lever holder and a locking catch, a coupling device for coupling the brake actuation lever to a brake cable, and a release device including a push rod which is displaceable along the brake actuation lever from an inoperative position to a release position. Here, the locking catch is also in the form of a double lever and is articulated pivotably to the brake actuation lever, an engaging dog arranged at the end of the first lever arm being preloaded in the direction of the toothing by a catch spring engaging on the end of the second lever arm. In this embodiment, the push rod of the release device is not connected pivotably to the locking catch but has on its end oriented towards the locking catch an impact region with which the push rod, in an actuating position of the locking catch, moves out of an engaged position, against the preloading of the catch spring, and displaces the engaging dog arranged on the second lever arm from the toothing. Through the lack of a coupling of the push rod to the locking catch in the inoperative position of the push rod, vibrations of the locking catch as it is displaced along the toothing are not transmitted to the push rod and therefore not to the interior of the motor vehicle. However, the disadvantage in this case also is that the return movement of the push rod, with its impact in the inoperative position, produces high mechanical stress on the push rod and components connected thereto, and disturbing noise is generated.

DE 101 27 505 A1 describes a parking brake for a motor vehicle with a locking device which includes a locking catch and a release device which includes a push rod. The locking catch is in the form of a double lever with a first lever arm and a second lever arm, an engaging dog for engaging in a toothing being arranged on the second lever arm. The first lever arm of the locking catch is guided at its end in a linking element, the end of the first lever arm passing through a slot arranged in the linking element. The end of the linking element oriented away from the slot is connected to a push rod, the push rod and the linking element being displaceable with respect to one another and being preloaded against one another by means of a first spring element. The push rod is preloaded in the direction of an inoperative position with respect to a brake actuation lever by means of a second spring element. In this embodiment also, high mechanical forces act on the push rod as it is moved from a release position to the inoperative position, whereby disturbing noises are likewise produced.

SUMMARY OF THE INVENTION

It is the object of the invention to provide a parking brake for a motor vehicle which makes possible low-noise actuation and release, and in which high mechanical stresses on the release device are avoided.

Through the inventive provision of a damping element assigned to the push rod, the damping element cooperating with the guide element at least in the inoperative position of the push rod, it is advantageously made possible that a displacement movement of the push rod with respect to the brake actuation lever takes place without excessive accelerations or changes of acceleration over time, even when the respective end position of the movement is reached, so that mechanical stress on the elements of the parking brake on the one hand, and noise generation on the other, are advantageously avoided. In particular, in this case a displacement movement of the push rod driven by the spring element in the direction of the inoperative position is advantageously damped, and a hard impact of the push rod in the inoperative position is avoided. It is therefore advantageously made possible to configure the spring element with a high spring force necessary for reliable operation of the parking brake, without subjecting the other elements of the parking brake to high stresses and the associated increase in wear. As a further advantage, the damped return movement of the push rod and, in particular, of the release element connected thereto, enhances the operating comfort of the parking brake for the user. Furthermore, in particular through a cooperation of the damping element with the guide element, good mechanical damping is achieved without the need for further constructional elements.

The guide element is usefully provided in such a manner that it projects at least partially into the aperture of the push rod. Especially preferably, the guide element is in sliding contact with the push rod, whereby secure guidance of a displacement movement of the push rod is achieved in an especially simple manner. In particular, through the configuration of the guide element as a pin or rivet passing through the aperture, an especially easily manufactured and secure guidance of the push rod is ensured.

The aperture of the push rod advantageously has a stop region for interaction with the guide element. The inoperative position of the push record is thereby advantageously defined and a displacement movement driven by the spring element limited.

In an especially preferred configuration of the parking brake, the aperture of the push rod is configured as a slot. In this case the long axis of the slot is preferably arranged parallel to the direction of movement of the push rod, so that secure guidance of the push rod by a guide element preferably passing through the aperture is ensured. It has to be understood, however, that the aperture may also have any other configuration, in particular a curved shape along the direction of movement of the push rod, if the push rod does not execute a rectilinear movement in moving from the inoperative position to the actuation position.

The damping element is preferably assigned to a region of the push rod adjacent to the stop region. Damping of the push rod movement in a region close to the inoperative position of the push rod is thereby made possible in an especially simple manner in terms of construction.

The push rod and the damping element are preferably formed integrally. It is thereby advantageously ensured that damping element and push rod are securely and permanently connected to one another and, in particular, that no slippage of the damping element out of the optimum position with respect to the push rod is possible. In addition, increased manufacturing costs for subsequent connection of damping element and push rod are advantageously avoided. In a particularly preferred configuration, push rod and damping element are produced integrally as a plastics injection molding, making possible especially low-cost manufacture and ensuring good mechanical properties, in particular with regard to damping. In an alternative configuration, damping element and push rod are produced separately from different materials, whereby the individual components can each be optimized for preferred mechanical properties. In particular, push rod and/or damping element may be produced from a metal, while a surface coating of plastics material for the components may be provided for further improvement of the surface properties.

In a preferred configuration, the damping element is arranged in a region which is at least partially relieved of the material of the push rod. In particular if the push rod and the damping element are formed integrally and/or are made of plastics material, a damping element which has the necessary deformability and resilient displaceability is produced in a simple manner by forming the damping element as a part of the push rod which is relieved of surrounding push rod material and is directly adjacent to the stop region. In an alternative configuration the damping element may be formed by an undercut of the stop region of the push rod.

The damping element is preferably formed from an elastic material. This advantageously makes possible damping of the displacement movement of the push rod over a relatively large displacement region, and therefore an effective reduction of mechanical stress.

The damping element can preferably be displaced reversibly by displacement of the push rod in the direction of the inoperative position. In this preferred configuration it is advantageously made possible that the damping element acts mechanically like a spring. An impact of the moving push rod at the rest position is thereby effectively damped.

The parking brake is advantageously configured as a handbrake, the brake actuation lever being configured as a handbrake lever and the release element as a push button. Especially preferably in this case, the push button is fixed on the push rod by means of a latching arrangement.

In an alternative configuration, the parking brake is configured as a foot parking brake and the brake actuation lever as a pedal.

The aperture of the push rod is preferably arranged in a region of the push rod oriented away from the release element. Secure guidance of the push rod is thereby ensured, especially if the aperture is arranged in a region close to the locking catch. This configuration also reduces the danger of bending of the push rod and ensures that a precisely defined and exactly aligned impact on the locking catch is executed by the push rod in the release position thereof.

The catch spring is preferably in the form of a compression spring. In this case the spring element especially preferably preloads the push rod in a direction opposite to the preloading direction of the catch spring, with a greater spring force in comparison to the catch spring. Unintended release of the handbrake is thereby avoided and improved operating safety of the handbrake is achieved. In this embodiment the spring force of the catch spring may advantageously be relatively low, resulting in especially low noise generation upon actuation of the parking brake and displacement of the locking catch along the toothing.

Especially preferably, the push rod moves the locking catch out of engagement with the toothing against the preload of the catch spring only in a region close to the release position. In this configuration, noise generation upon actuation of the parking brake is advantageously avoided, since noises produced during a displacement movement of the locking catch along the toothing are not transmitted by a mechanical coupling to the push rod and therefore into the interior of the vehicle.

In a preferred configuration of a parking brake according to the invention, the guide element is in the form of a cylindrical pin which cooperates with the damping element in the inoperative position of the push rod. Especially preferably, a circumferentially projecting head is assigned with the pin. In particular if the push rod has a recess in a region assigned with the damping element, a cooperation of the guide element with the damping element over a relatively long travel distance of the push rod is advantageously achieved by the projecting head, resulting in improved damping of the push rod movement.

In an alternative preferred configuration, the guide element is arranged entirely within the aperture in the inoperative position of the push rod. In this configuration the guide element preferably has a cuboidal or cylindrical form, advantageously making possible simpler production and positioning of the guide element.

The guide element is advantageously arranged on the lever holder. This makes possible secure guidance of the push rod in a simple manner. In an alternative embodiment, the guide element is arranged on the locking catch A push rod according to the invention for use in a motor vehicle parking brake comprises a first end which can be assigned to a release element, a second end which can be assigned to a locking catch and a continuous opening for receiving a guide element, a damping element being assigned to the continuous opening, which damping element is arranged at least partially within the continuous opening in an unloaded state and can be displaced completely into a region outside the continuous opening in a loaded state. Through the provision of a damping element, a push rod for a motor vehicle parking brake is provided which advantageously reduces mechanical stresses, both on the push rod itself and on other elements which can be connected to the push rod, during a displacement movement, and therefore makes possible especially low-noise parking brakes which suffer little wear and are comfortable to operate.

The continuous opening is preferably configured as a slot. In this case the slot may advantageously have a straight or curved configuration, whereby in each case precise guidance of the push rod by a guide element engaging in the slot is advantageously made possible.

In a preferred configuration, the damping element is formed integrally with the push rod. This advantageously simplifies manufacture of the push rod according to the invention, since complex and costly positioning and connecting of damping element and push rod are dispensed with. Furthermore, subsequent detachment or displacement of the damping element with respect to the push rod is thereby avoided.

The push rod is advantageously made of a plastics material. If, in particular, the push rod and the damping element are formed integrally, this advantageously results, on the one hand, in a strength of the push rod which is sufficient to meet the demands and, on the other, in very good damping of the push rod movement by the damping element.

Further advantages and features of the invention are apparent from the following description of a preferred exemplary embodiment.

The invention is explained in more detail below with reference to a preferred exemplary embodiment and to the appended drawings.

DETAILED DESCRIPTION

Figure 1:
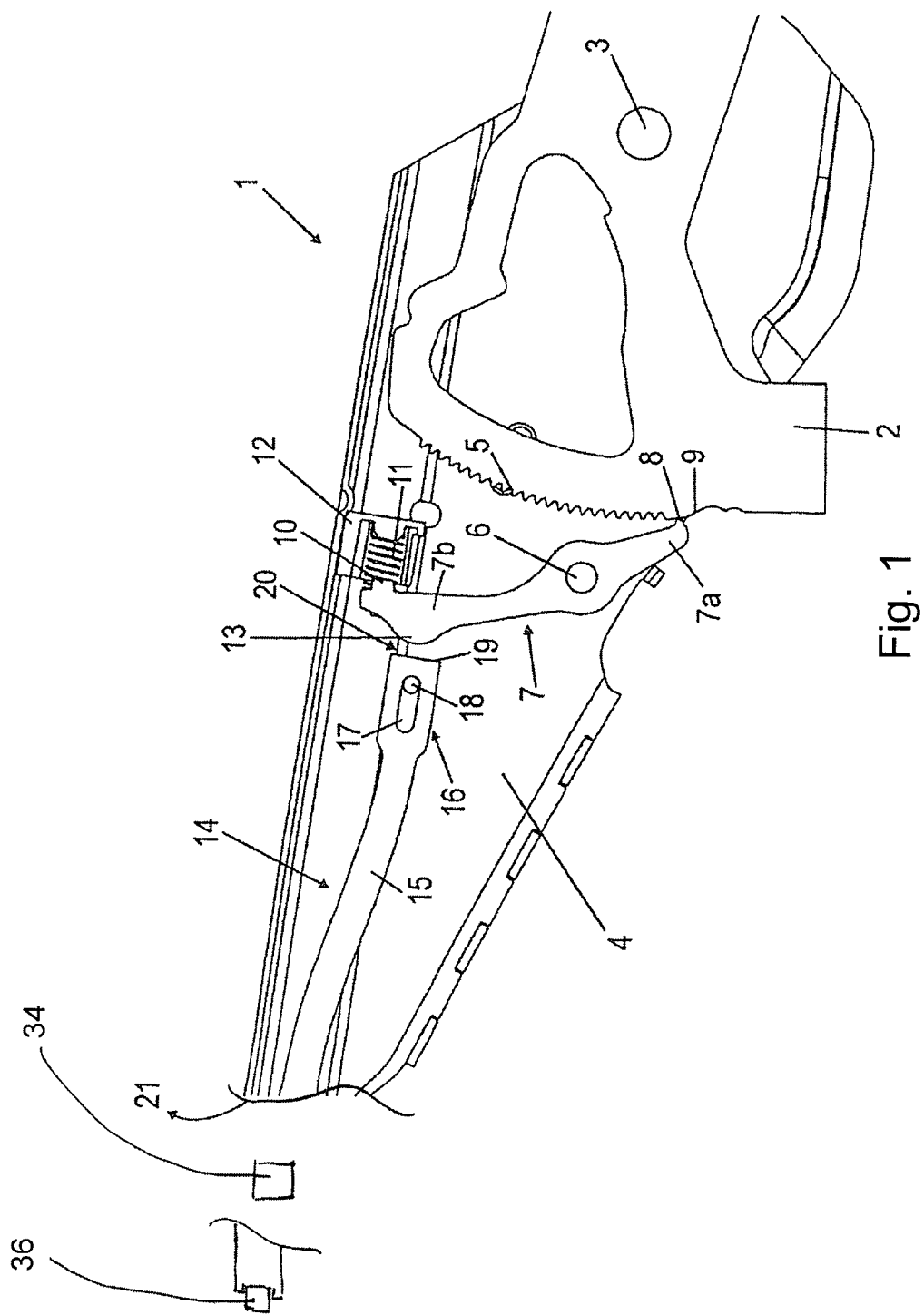
FIG. 1 shows a preferred exemplary embodiment of a parking brake according to the invention in a cut-away view.
Figure 2:
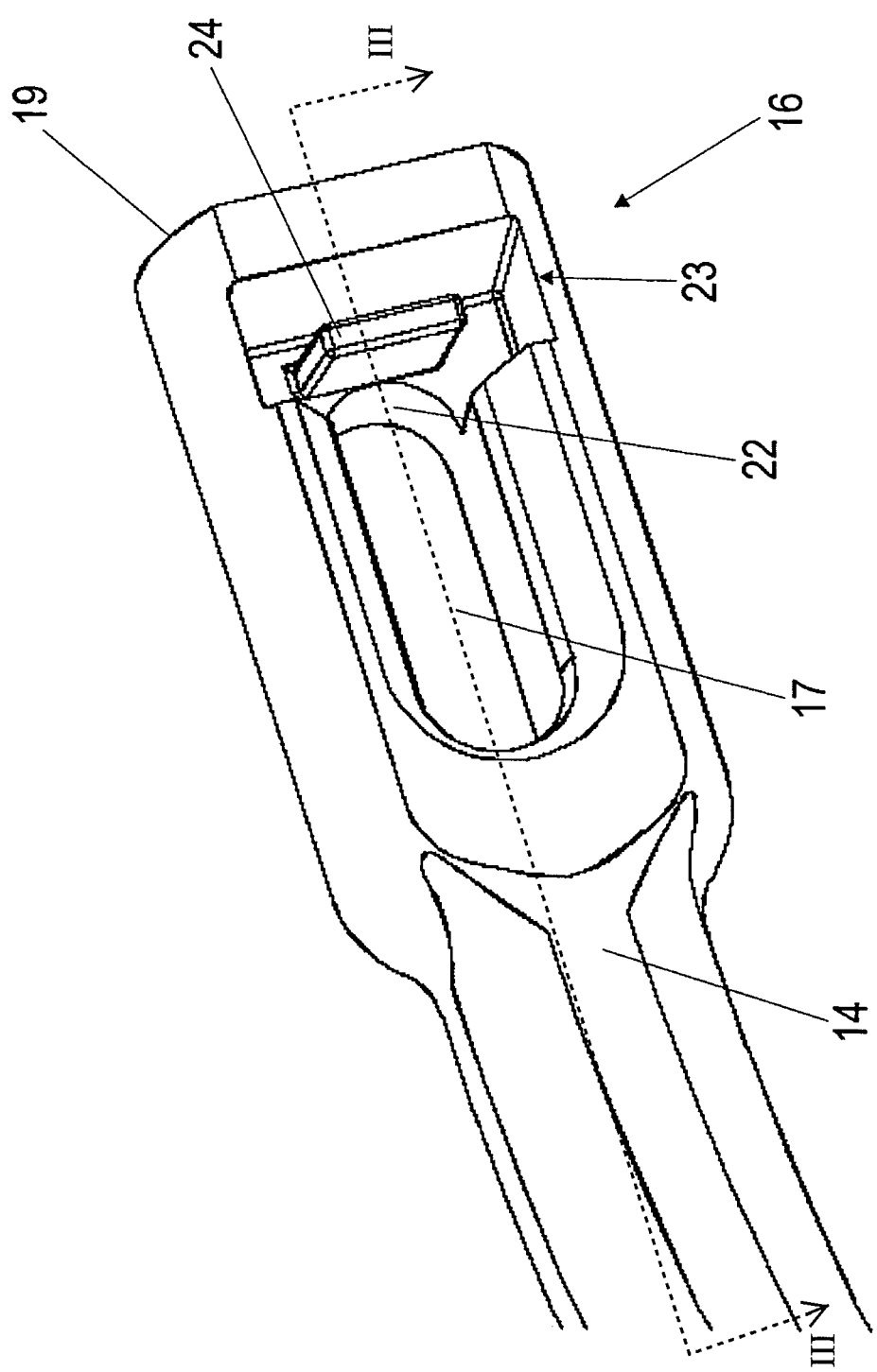
FIG. 2 shows a greatly enlarged detail of the parking brake represented in FIG. 1.
Figure 3:
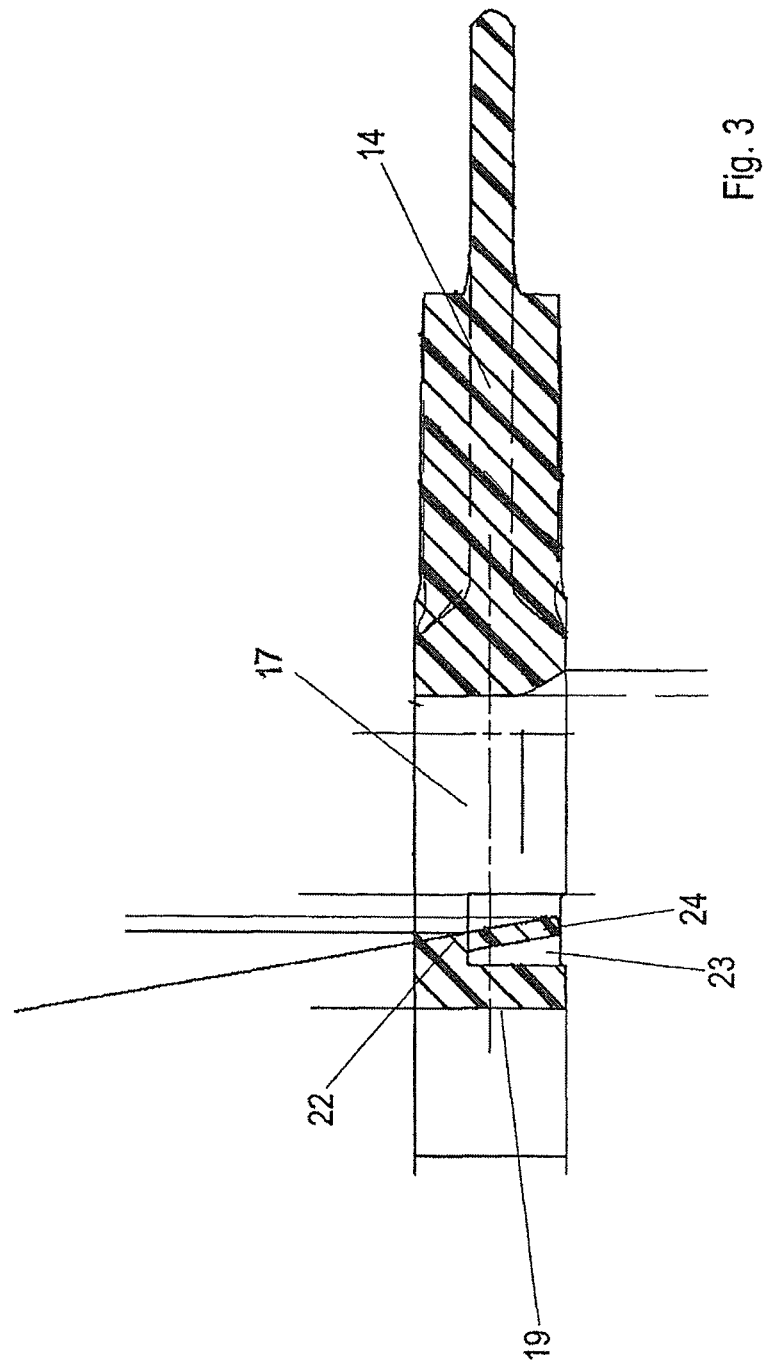
FIG. 3 shows the part of the parking brake represented in FIG. 2 in a sectional view along III-III.

The exemplary embodiment of an inventive parking brake 1 for a motor vehicle represented in FIG. 1 to FIG. 3 comprises a lever holder 2 arranged in fixed manner on the vehicle body and a brake actuation lever 4 arranged pivotably on the lever holder 2 by means of an articulated joint 3. The lever holder 2 has in a partial region a toothing 5 which is arranged on a segment of a circle the centre of which is formed by the articulated joint 3. A locking catch 7 is connected pivotably about a pivot point 6 to the brake actuation lever 4 and is in the form of a double lever with a first lever arm 7a and a second lever arm 7b. On the end of the first lever arm 7a oriented away from the pivot point 6, the locking catch 7 has an engaging dog 8 which cooperates with the toothing 7 and, in a fully released position of the parking brake, rests in a recess 9 arranged below the toothing 5. The second lever arm 7b of the locking catch 7 has on its end oriented away from the pivot point 6 a spring seat 10 on which a catch spring 11 in the form of a compression spring engages. The catch spring 11 is arranged in a housing 12 on the brake actuation lever 4. The second lever arm 7b of the locking catch 7 further has an impact section 13 for interaction with the push rod 14.

The push rod 14 is mounted displaceably on the brake actuation lever 4 and has a push rod body 15 with a first end 16 and a second end (not shown). Arranged in the first end 16 of the push rod 14 is an aperture 17 in the form of a slot which is arranged slidingly on a guide element 18 fixed to the brake actuation lever 4. A displacement movement of the push rod 14 is guided by the cooperation of the aperture 17 and the guide element 18, which is in the form of a rivet in the present case. In the inoperative position of the push rod 14, there is a gap 20 between the impact region 13 of the locking catch 7 and an impact region 19 of the push rod.

The push rod 14 is preloaded in the direction away from the locking catch 7 by a spring element (not shown) arranged in the region of the second end of the push rod 14. The inoperative position of the push rod 14 is defined by the position in which the push rod 14 is displaced fully away from the locking catch 7 and in which the guide element 18 rests laterally against the edge of the aperture 17 oriented towards the impact region 19.

As can be seen especially clearly in FIG. 2, the first end of the push rod 14 has a thickened and substantially cuboidal configuration, as compared to a middle region of the push rod 14. The impact region 19 is arranged on the end face of the cuboidal end oriented away from the rest of the push rod body. The aperture 17 is in the form of a slot and passes through the cuboidal end substantially centrally and perpendicularly to two opposite side faces of the cuboid. Provided on the end of the aperture 17 oriented towards the impact region 19 is a recess 23 formed by a relieving of material which opens up a region with a substantially rectangular perimeter and which extends through approximately half the thickness of the push rod, starting from one of the side faces in which the aperture is formed. A damping element 24, configured in the manner of a leaf spring in the present case, is formed approximately at the centre of the recess 23. As can be clearly seen especially in FIG. 3, the damping element 24 is arranged entirely in the recess 23 and, in the non-loaded state illustrated in FIG. 3, projects partially into the aperture 17. In this case the damping element has an angle of inclination of approximately 80° with respect to the apertured side face. In the present example, the damping element 24 is formed integrally with the push rod 14.

In the region which does not include the recess 23, the end of the aperture 17 oriented towards the impact region 19 forms a stop region 22 against which the guide element 18 rests in the inoperative position of the push rod 14.

The invention operates in the following manner:

Starting from a completely disengaged position, the parking brake is actuated by a pivoting movement of the brake actuation lever 4 in the direction of the arrow 21. As this happens, the engaging dog 8 of the locking catch 7 is displaced along the toothing 5 and in its end position is preloaded into the toothing 5 by the catch spring 11. In the locked position, the push rod 14 is in its inoperative position; that is, the guide element 18 abuts the stop region 22 of the aperture 17, a gap 20 being provided between the end region 19 of the push rod 14 and the impact section 13 of the locking catch 7. At the same time, in the inoperative position of the push rod 14, the damping element 24 is in a loaded state and is forced completely out of the region of the aperture 17 by the guide element 18. In the loaded state, which is shown in FIG. 2, the damping element 24 has an inclination of approximately 90° with respect to the apertured side face.

In order to release the parking brake 1, the push rod 14, starting from its inoperative position, is displaced in the direction of its release position by actuation of a schematically shown push button 36 (see FIG. 1—the shape of push button 36 not being shown in the FIG. 1) towards the locking catch 7 against a preload exerted by a schematically shown spring element 34 (see FIG. 1—the shape of spring element 34 not being shown in the FIG. 1). At the same time the brake actuation lever 4 is raised. In the release position of the push rod 14, the locking catch 7 is moved out of the toothing 5 by an interaction of its impact section 13 with the impact region 19 of the push rod 14. During its displacement movement the push rod 14 is displaced along the guide element 18 passing through the aperture 17, the stop region 22 being moved away from the guide element 18 and the damping element reaching an unloaded state in which it projects into the aperture 17. In the retracted position of the locking catch 7 the brake actuation lever 4 can be pivoted against the direction of the arrow 21 and set down. After the pivoting movement of the brake actuation lever 4 has ended and the push button 36 has been released, the push rod 14, driven by the preload of the spring element 34, is moved back to its inoperative position. Through the displacement movement of the push rod 14, the damping element 24 gradually comes more strongly into contact with the guide element 18 and is displaced thereby out of the region of the aperture 17, whereby the displacement movement of the push rod is increasingly retarded. A sudden impact of the guide element 18 in the stop region 22 of the aperture 17, and an accompanying high mechanical stress on the push rod 14 and the push button 36, is thereby avoided. The damping element 24 exerts a damping force on the push rod 14 in the manner of a leaf spring. In a preferred configuration, the guide element 18 is in the form of a cylindrical pin which cooperates with the damping element 24 in the inoperative position of the push rod 14.

In the foregoing, an exemplary embodiment of an inventive parking brake in which the braking element is formed integrally with the push rod was described. It has to be understood that the damping element may also be formed as a separate component.

In the exemplary embodiment described above, the catch spring is in the form of a compression spring. It has to be understood that the catch spring may also be in the form of a tension spring, which may optionally be coupled to the spring element which preloads the push rod. It likewise has to be understood that the catch spring may also have any other form and, in particular, may be in the form of a rotative spring or a leaf spring.

Furthermore, in the above-described exemplary embodiment of a parking brake according to the invention, the locking catch is in the form of a continuous, two-armed lever. It has to be understood that the locking catch may also be in the form of a one-armed lever. Likewise, the locking catch may also be configured as a two-part locking catch, with separate catch arms between which a coupling is provided for only one of the possible actuation directions.

It also has to be understood that the guide element may be formed integrally with a part of the locking catch or may be coupled to said part. Likewise, in an alternative configuration of an inventive parking brake, the guide element may be connected to the lever holder.

The invention claimed is:

1. A parking brake for a motor vehicle, comprising
a brake actuation lever which is arranged pivotably on a lever holder,
a locking device, comprising a toothing arranged on the lever holder and a locking catch engaging in the toothing,
a catch spring for preloading the locking catch in the direction of the toothing,
a release device, including a push rod and a release, wherein the push rod is displaceable along the brake actuation lever between an inoperative position and a release position, and wherein the push rod comprises an aperture,
a guide for guiding the push rod, the guide being arranged fixedly on the brake actuation lever, and
a spring for preloading the push rod,
wherein a damper is assigned to the push rod, and
wherein the damper cooperates with the guide at least in the inoperative position of the push rod,
wherein the damper is arranged and configured such that during operation of the parking brake the damper is movable between a loaded state in which the damper is forced completely out of a region of the aperture in the push rod and unloaded state in which the damper projects into the aperture.

2. The parking brake as claimed in claim 1, wherein the guide projects at least partially into the aperture of the push rod.

3. The parking brake as claimed in claim 1, wherein the aperture comprises a stop region for cooperating with the guide.

4. The parking brake as claimed in claim 3, wherein the damper is assigned to a region of the push rod adjacent to the stop region.

5. The parking brake as claimed in claim 1, wherein the aperture is configured as a slot.

6. The parking brake as claimed in claim 1, wherein the damper and the push rod are formed integrally.

7. The parking brake as claimed in claim 1, wherein the damper is arranged in a region which is relieved at least partially of the material of the push rod.

8. The parking brake as claimed in claim 1, wherein the damper is formed from an elastic material.

9. The parking brake as claimed in claim 1, wherein, upon attainment of the inoperative position of the push rod, the damper is deformed reversibly.

10. The parking brake as claimed in claim 1, wherein the brake actuation lever is configured as a handbrake lever, and wherein the release is configured as a push button.

11. The parking brake as claimed in claim 1, wherein the aperture is arranged in a region of the push rod oriented away from the release.

12. The parking brake as claimed in claim 1, wherein the catch spring is configured as a compression spring.

13. The parking brake as claimed in claim 1, wherein the spring preloads the push rod in the direction of the inoperative position, the spring having a spring force which is greater than a spring force of the catch spring.

14. The parking brake as claimed in claim 1, wherein the push rod is configured to move the locking catch out of engagement with the toothing against the preload of the catch spring only in a region close to the release position of the push rod.

15. The parking brake as claimed in claim 1, wherein the guide is configured as a cylindrical pin, and wherein the cylindrical pin cooperates with the damper in the inoperative position of the push rod.

16. The parking brake as claimed in claim 1, wherein the guide is arranged completely within the aperture in the inoperative position of the push rod.

17. The parking brake as claimed in claim 1, wherein the guide is arranged on the lever holder.

18. A motor vehicle including the parking brake as claimed in claim 1.

19. The parking brake as claimed in claim 1, wherein the damper is a leaf spring.

20. A parking brake for a motor vehicle, comprising
- a brake actuation lever which is arranged pivotably on a lever holder,
- a locking device, comprising a toothing arranged on the lever holder and a locking catch engaging in the toothing,
- a catch spring for preloading the locking catch in the direction of the toothing,
- a release device, including a push rod and a release, wherein the push rod is displaceable along the brake actuation lever between an inoperative position and a release position, and wherein the push rod comprises an aperture,
- a guide for guiding the push rod, the guide being arranged fixedly on the brake actuation lever, and
- a spring for preloading the push rod,
- wherein a damper is assigned to the push rod, and
- wherein the damper cooperates with the guide at least in the inoperative position of the push rod,
- wherein the damper is a leaf spring.

* * * * *